US012260557B2

(12) United States Patent
Wei et al.

(10) Patent No.: US 12,260,557 B2
(45) Date of Patent: Mar. 25, 2025

(54) OBJECT SELECTION FOR IMAGES USING IMAGE REGIONS

(71) Applicant: ADOBE INC., San Jose, CA (US)

(72) Inventors: Zijun Wei, San Jose, CA (US); Yilin Wang, Sunnyvale, CA (US); Jianming Zhang, Fremont, CA (US); He Zhang, Santa Clara, CA (US)

(73) Assignee: adobe inc., San Jose, CA (US)

( * ) Notice: Subject to any disclaimer, the term of this patent is extended or adjusted under 35 U.S.C. 154(b) by 368 days.

(21) Appl. No.: 17/838,995

(22) Filed: Jun. 13, 2022

(65) Prior Publication Data

US 2023/0401718 A1 Dec. 14, 2023

(51) Int. Cl.
| | |
|---|---|
| *G06K 9/00* | (2022.01) |
| *G06T 7/11* | (2017.01) |
| *G06T 7/136* | (2017.01) |
| *G06V 10/46* | (2022.01) |
| *G06V 10/764* | (2022.01) |

(52) U.S. Cl.
CPC .............. *G06T 7/11* (2017.01); *G06T 7/136* (2017.01); *G06V 10/462* (2022.01); *G06V 10/764* (2022.01)

(58) Field of Classification Search
CPC ......... G06T 7/11; G06T 7/136; G06V 10/462; G06V 10/764

USPC ........................................................ 382/173
See application file for complete search history.

(56) References Cited

PUBLICATIONS

Dabkowski, Piotr, and Yarin Gal. "Real time image saliency for black box classifiers." Advances in neural information processing systems 30 (2017). (Year: 2017).*
Petsiuk, Vitali, et al. "Black-box explanation of object detectors via saliency maps." Proceedings of the IEEE/CVF Conference on Computer Vision and Pattern Recognition. 2021. (Year: 2021).*
Shimoda, Wataru, and Keiji Yanai. "Weakly supervised semantic segmentation using distinct class specific saliency maps." Computer vision and image understanding 191 (2020): 102712. (Year: 2020).*
García, Germán M., et al. "Saliency-based object discovery on RGB-D data with a late-fusion approach." 2015 IEEE International Conference on Robotics and Automation (ICRA). IEEE, 2015. (Year: 2015).*

* cited by examiner

*Primary Examiner* — Jonathan S Lee
(74) *Attorney, Agent, or Firm* — Shook Hardy & Bacon LLP

(57) ABSTRACT

An image processing system generates an image mask from an image. The image is processed by an object detector to identify a region having an object, and the region is classified based on an object type of the object. A masking pipeline is selected from a number of masking pipelines based on the classification of the region. The region is processed using the masking pipeline to generate a region mask. An image mask for the image is generated using the region mask.

16 Claims, 7 Drawing Sheets

OBJECT SELECTION FOR IMAGES USING IMAGE REGIONS

BACKGROUND

In image and video editing and composition, users often desire to extract or otherwise segment an object or multiple objects (i.e., the foreground) from the remainder (i.e., the background) of an image. Masking is a process used to separate a foreground object from the background of an image. An image mask may include, for instance, values for each pixel to indicate which pixels have foreground information and which pixels have background information. In some cases, some pixels of an image, particularly those around edges of objects and in regions corresponding to hair, glass, and motion blur, can have values indicative of a combination of both foreground and background information. When applied to an image, an image mask separates the foreground object(s) from the background.

SUMMARY

Some aspects of the present technology relate to, among other things, an image processing system that generates image masks selecting objects from images by processing regions of the images. In accordance with some aspects, an image is received for selecting one or more objects from the image. An object detector identifies one or more regions of the image with each region including one or more objects. Each region is classified based on a type of object within the region. For each region, a masking pipeline is selected from a number of available masking pipelines based on the classification of the region, and a region mask is generated for the region using the selected masking pipeline. An image mask for the image is generated by merging the region masks and setting any area of the image outside the regions as background.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
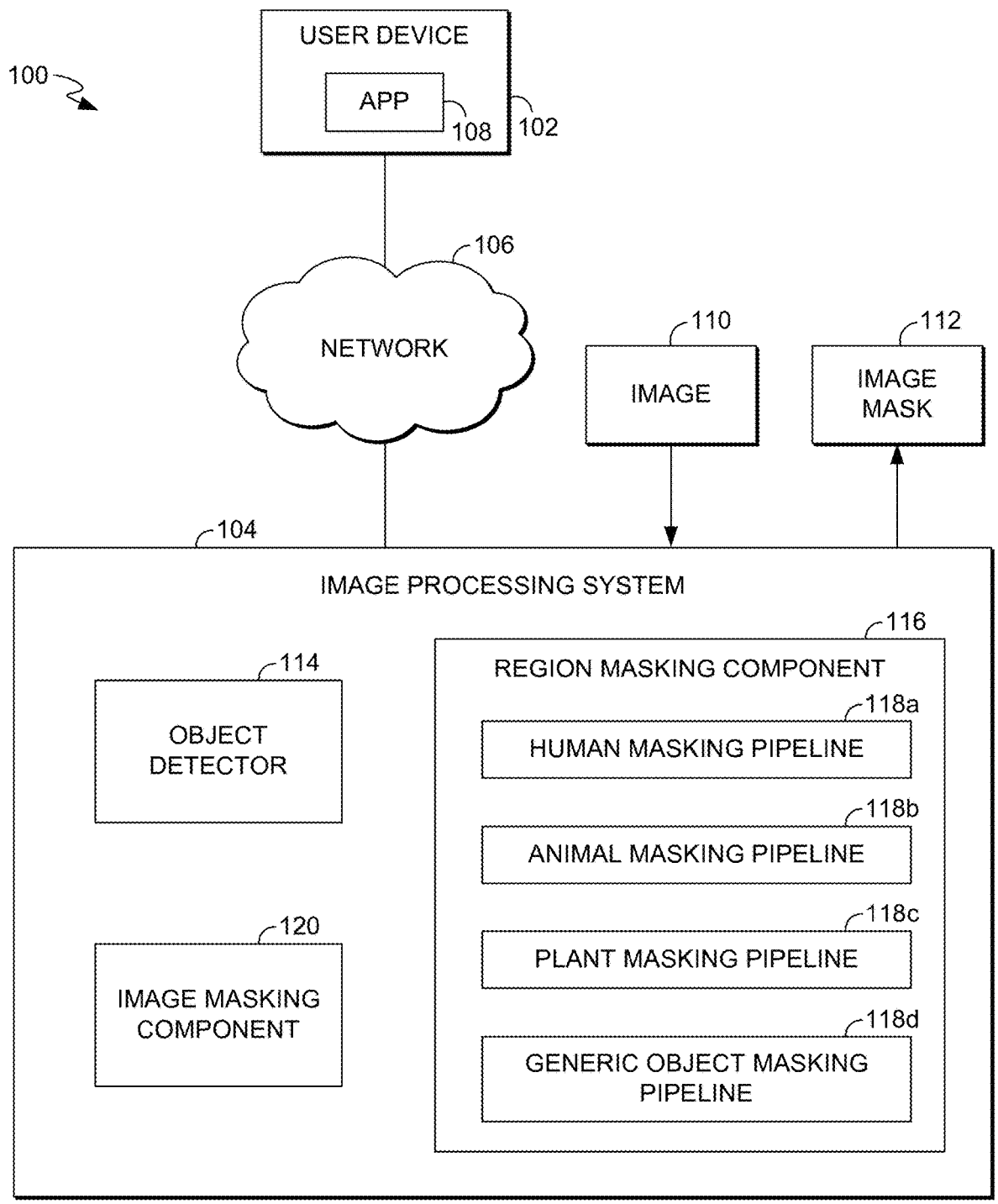
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "region" refers to a portion of an image comprising less than the entire image. A region includes one or more objects and an area surrounding the one or more objects. An "object" is a portion of an image that is possibly a subject for selection from the image. In some instances, an object is considered as foreground of an image, while an area surrounding an object is considered as background of the image. In accordance with aspects of the technology described herein, a region can be assigned a "classification" that is based on an object type for one or more objects within the region.

The term "saliency" refers to an extent to which an object is likely a target for selection from an image. An object and/or a region comprising an object can be assigned a "saliency score" that reflects the saliency of the object. A "salient object" refers to an object identified as a target for selection from an image.

An "image mask" refers to an image generated from an input image in which pixel values are set to identify one or more objects from a background surrounding the object(s) in the input image. In some instances, an image mask is a binary image in which pixels corresponding to an object are set to a first value (e.g., one), while pixels corresponding to area surrounding the object are set to a second value (e.g., zero). In some instance, an image mask is a trimap that includes a certain foreground in which pixels corresponding to an object are set to a first value (e.g., one), a certain background in which pixels corresponding to area surrounding the object are set to a second value (e.g., zero), and unknown area in which pixels that can correspond to an object and/or surrounding area are set to one or more other values (e.g., between zero and one).

In accordance with the technology described herein, a "region mask" refers to an image generated from a region of an image in which pixel values are set to identify one or more objects from a background surrounding the object(s) in the region. In some instances, a region mask comprises a binary image; while in other instances, a region mask comprises a trimap.

In accordance with the technology described herein, a "masking pipeline" comprises one or more operations for generating a region mask from a region of an image. In accordance with some aspects of the technology described herein, a masking pipeline is optimized for a certain type of object. In some configurations, a masking pipeline can comprise one or more machine learning models (e.g., neural networks) that have been trained on images of a particular object type. For instance, one masking pipeline can be configured to generate a region mask for a region containing an animal, while another masking pipeline can be configured to generate a region mask for a region containing a plant.

Overview

One conventional approach to masking involves a user manually drawing a boundary around an object in an image to segment the object from the image. This is not only time-consuming but can provide lackluster results depending on how accurately the user can draw the boundary around the subject. Given this, some image editing applications provide features that automatically select and segment objects from images. However, developing an approach for a computer to automatically detect an object in an image and determine the object's boundary for segmentation is difficult. While images with simple backgrounds and clear boundaries between objects and background are generally easier to process, conventional image processing applications have difficulty in cleanly segmenting objects in the case of more complex boundaries and/or when an object has a more complex edge, such as portions of an object with hair or fur.

Aspects of the technology described herein address the shortcomings of conventional image processing systems by providing an approach for improved selection of objects from images. At a high level, the technology described herein generates image masks selecting objects from images by processing regions of images using different masking pipelines optimized for different object types.

In accordance with some aspects of the technology described herein, an image is received from which one or more objects are to be selected. The image is processed by an object detector that identifies one or more regions of the image with each region comprising one or more objects and an area surrounding the object(s). In some configurations, the object detector assigns a saliency score to each region, and regions are selected for further processing if the saliency score for the regions satisfy a saliency threshold. The object detector also assigns a classification to each region based on an object type of an object within the region.

For each region of the image, a masking pipeline is selected based on the classification of the region. For instance, if a region is classified as animal (e.g., because the region contains an animal), an animal masking pipeline is selected for processing the region. As another example, if a region is classified as plant (e.g., because the region contains a plant), a plant masking pipeline is selected for processing the region. The masking pipeline selected for a region generates a region mask for the region. The region mask identifies the object(s) in the region separate from an area of the region surrounding the object(s).

An image mask for the image is generated by merging region mask(s). In some instances, an image includes only a single region or non-overlapping regions. In such instances, pixels of the image mask corresponding to the region(s) are set based on pixels of the region mask(s), and pixels of the image mask corresponding to areas outside the region(s) are set to a background value. In some instances, an image includes overlapping regions. In such instances, region masks can be weighted based on saliency when merging the region masks to generate the image mask.

Aspects of the technology described herein provide a number of improvements over existing technologies. For instance, instead of using a single masking pipeline to process all types of objects in an image, aspects of the technology described herein identify regions of an image comprising objects and generates a region mask for each of those regions using a masking pipeline that is optimized for a type of object in each region. As such, the image mask generated from the region masks provides better masking results. Additionally, in instances in which there are overlapping regions, aspects of the technology provide for generating an image mask by merging overlapping region masks based on saliency, thereby providing better masking results.

Example System for Object Selection

With reference now to the drawings, FIG. 1 is a block diagram illustrating an exemplary system 100 for selecting objects from an image in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image processing system 104. Each of the user device 102 and image processing system 104 shown in FIG. 1 can comprise one or more computer devices, such as the computing device 700 of FIG. 7, discussed below. As shown in FIG. 1, the user device 102 and the image processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image processing system 104 could be provided by multiple server devices collectively providing the functionality of the image processing system 104 as described herein. Additionally, other components not shown can also be included within the network environment.

The user device 102 can be a client device on the client-side of operating environment 100, while the image processing system 104 can be on the server-side of operating environment 100. The image processing system 104 can comprise server-side software designed to work in conjunction with client-side software on the user device 102 so as to implement any combination of the features and functionalities discussed in the present disclosure. For instance, the user device 102 can include an application 108 for interacting with the image processing system 104. The application 108 can be, for instance, a web browser or a dedicated application for providing functions, such as those described herein. For instance, the application 108 can facilitate presentation of user interfaces that allow the user to interact with the processing system, such as submitting images for masking, as well as presenting images masks and/or masked images.

This division of operating environment 100 is provided to illustrate one example of a suitable environment, and there is no requirement for each implementation that any combination of the user device 102 and the image processing system 104 remain as separate entities. While the operating environment 100 illustrates a configuration in a networked environment with a separate user device and image processing system, it should be understood that other configurations can be employed in which components are combined. For instance, in some configurations, a user device can also provide image processing capabilities.

The user device 102 comprises any type of computing device capable of use by a user. For example, in one aspect, the user device is the type of computing device 700 described in relation to FIG. 7 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the image processing system 104 via the user device 102.

At a high level, the image processing system 104 receives an image, such as the image 110, and generates an image mask, such as the image mask 112, that selects one or more salient objects from the image. As shown in FIG. 1, the image processing system 104 includes an object detector 114, a region masking component 116, and an image masking component 120.

The components of the image processing system 104 can be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines can operate on one or more user devices, servers, can be distributed across one or more user devices and servers, or can be implemented in the cloud. Moreover, in some aspects, these components of the image processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The object detector 114 identifies one or more regions in an image, such as the image 110, where each region contains one or more objects that are likely targets for selection from the image. Some configurations employ salient object detection techniques to identify region(s) with salient object(s) in an image. Salient objects or regions are portions of an image that are more likely to attract human visual attention than surrounding areas of the image. Salient object detection techniques essentially mimic the ability of the human visual system to identify salient portions of an image. Any of a variety of different types of salient object detection methods can be employed, using conventional techniques and/or deep learning approaches.

In some configurations, the object detector 114 identifies regions of an image with salient objects and assigns a saliency score to each region. A saliency score for a region indicates a level of saliency for the region relative to other identified regions. As such, the saliency scores reflect a likelihood each region attracts visual attention. One or more regions can be selected for further processing based on the saliency scores. For instance, an approach can be used in which only regions with saliency scores above a certain saliency threshold are selected for further processing to select objects from an image.

The object detector 114 also classifies each region based on the type of object(s) within each region. For instance, if the object in a region is a person, the region can be classified as a person region. As another example, if the object in a region is an animal, the region can be classified as an animal region. As a further example, if the object in a region is a plant, the region can be classified as a plant region. In some cases, a region can be classified as generic, for instance, if an object doesn't otherwise fall into a specific category. It should be understood that these classifications are provided by way of example only and not limitation. Any type of region/object classification can be employed within the scope of embodiments of the technology described herein.

The region masking component 116 generates a region mask for each region identified by the object detector 114 for further processing. In some cases, a region mask is a binary image, in which pixels corresponding to foreground (i.e., a salient object) are set to a first value, while pixels corresponding to background (i.e., areas surrounding a salient object) are set to a second value. In some cases, a region mask is a trimap, in which pixels corresponding to foreground (i.e., a salient object) are set to a first value (e.g., one), pixels corresponding to background (i.e., areas surrounding a salient object) are set to a second value (e.g., zero), and pixels corresponding to unknown areas (i.e., unknown whether corresponding to foreground or background) are set to one or more other values.

For each region, the region masking component 116 selects a masking pipeline based on the classification of the region and processes the region using the selected masking pipeline to generate the region mask for the region. For instance, as shown in FIG. 1, a number of masking pipelines are available, including a human masking pipeline 118*a*, an animal masking pipeline 118*b*, a plant masking pipeline 118*c*, and a generic object masking pipeline 118*d*. If a region is classified as a human region, the human masking pipeline 118*a* would be selected and used to generate the region mask. If a region is classified as an animal region, the animal masking pipeline 118b would be selected and used to generate the region mask. If a region is classified as a plant region, the plant masking pipeline 118c would be selected and used to generate the region mask. If a region is classified as a generic region, the generic object masking pipeline 118d would be selected and used to generate the region mask. It should be understood that the masking pipelines shown in FIG. 1 are provided by way of example only. Masking pipelines for other object/region classifications can be used within the scope of the technology described herein.

Figure 2:
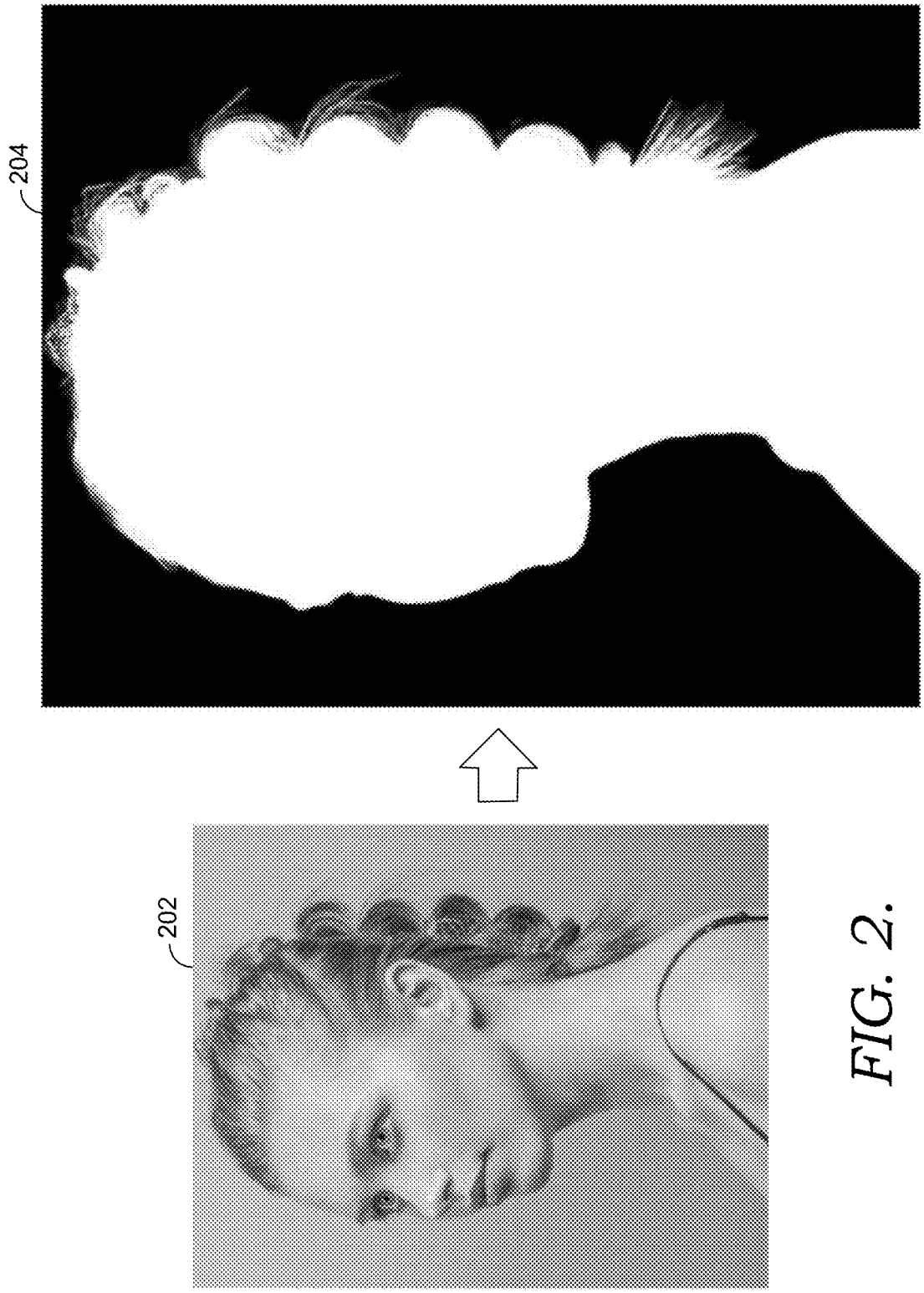
FIG. 2 is a diagram showing an example process for selecting objects in an image in accordance with some implementations of the present disclosure.
Figure 3:
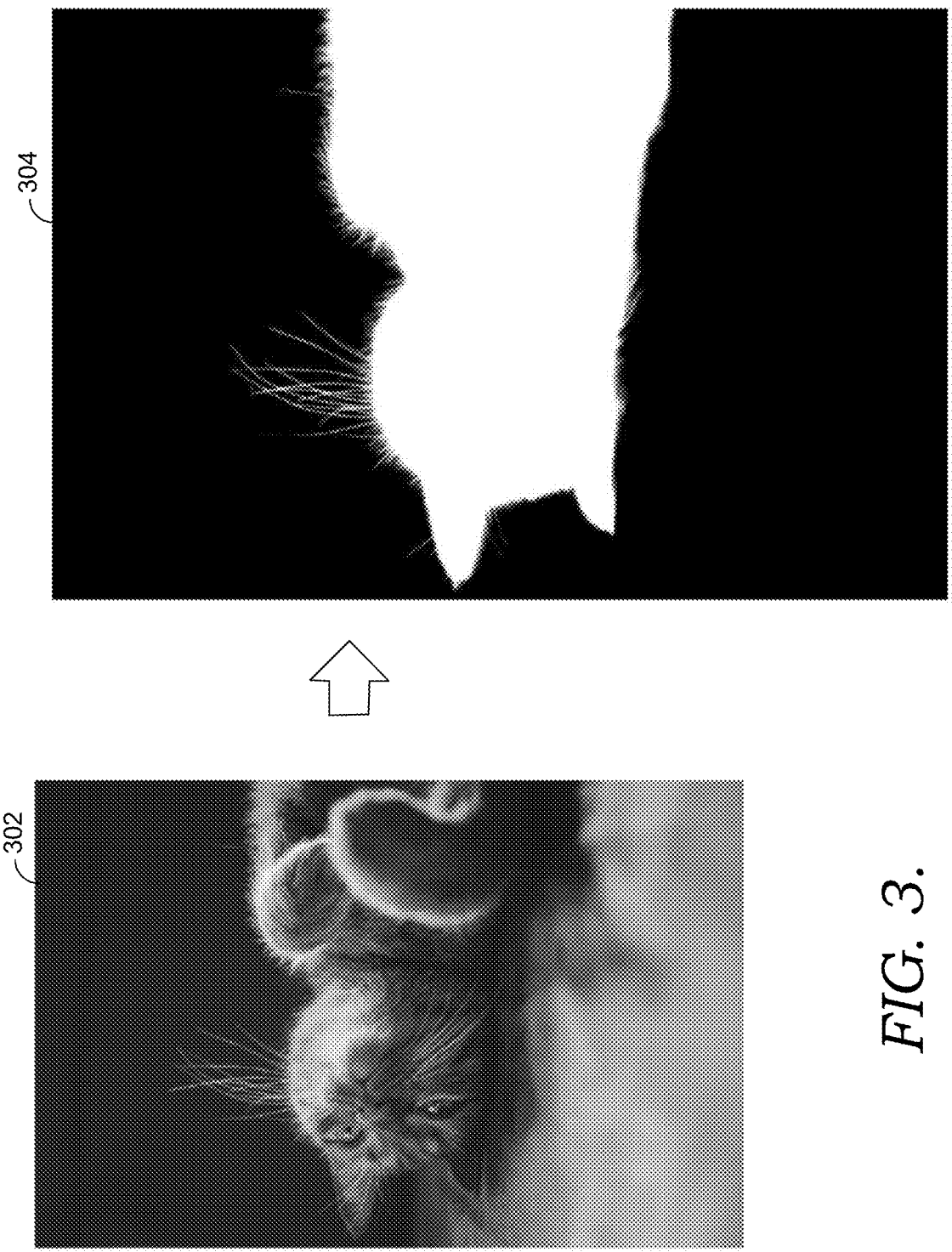
FIG. 3 is an example illustrating processing of an image region with a person object in accordance with some implementations of the present disclosure.

Instead of using a single masking pipeline for all types of objects, aspects of the technology described herein employ different masking pipelines optimized for different object types to provide improved masking results. This recognizes that different types of objects have different edge characteristics that impact the effectiveness of different masking operations. FIGS. 2 and 3 provide two examples to illustrate. FIG. 2 illustrates an image region 202 containing a person and a region mask 204 generated from the image region 202. As shown in FIG. 2, a portrait of a person tends to have a "fuzzier" edge around portions of the head where hair is located while having a "cleaner" edge at other locations. FIG. 3 illustrates an image region 302 containing an a cat (i.e., an animal) and a region mask 304 generated from the image region 302. In contrast to the image of the human, as shown in FIG. 3, an image of an animal tends to have a "fuzzier" edge around the entire object due to the animal's fur.

Each masking pipeline comprises one or more operations for generating a region mask from a region of an image with the operation(s) optimized for a corresponding object type. For instance, a masking pipeline can comprise one or more machine learning models (e.g., neural networks) that have been trained on images of a certain object type. For instance, the human masking pipeline 118 could employ machine learning models trained on images of humans, while the animal masking pipeline could employ machine learning models trained on images of animals. Operations performed by a masking pipeline, depending on the type of object, could include, for instance: identifying an initial boundary of an object within a region; refining the initial boundary to be smoother by recovering missing details of the boundary, forming a trimap identifying portions (e.g., pixels) as definite foreground (i.e., the object being selected), definite background (i.e., surrounding portion not being selected), or unknown whether foreground or background.

The image masking component 120 generates an image mask for an image given one or more region masks generated by the region masking component 116. For instance, FIG. 1 illustrates an image mask 112 generated from an image 110. In some cases, an image mask is a binary image, in which pixels corresponding to foreground (i.e., a salient object) are set to a first value (e.g., one), while pixels corresponding to background (i.e., areas surrounding a salient object) are set to a second value (e.g., zero). In some cases, an image mask is a trimap, in which pixels corresponding to foreground (i.e., a salient object) are set to a first value (e.g., one), pixels corresponding to background (i.e., areas surrounding a salient object) are set to a second value (e.g., zero), and pixels corresponding to unknown areas (i.e., unknown whether corresponding to foreground or background) are set to one or more other values (e.g., between zero and one).

The image masking component 120 can generate an image mask by merging the region mask(s) generated by the region masking component 116 and setting surrounding areas of the image mask as background. In instances in which there is a single region mask, pixels of the portion of the image mask corresponding to the region mask are set based on the pixels of the region mask, and the remaining pixels of the image mask outside the portions of the region mask are set to a value for background. In instances in which there are multiple region masks that do not overlap, pixels of the portions of the image mask corresponding to each region mask are set based on the pixels of each corresponding region mask, and the remaining pixels of the image mask outside the portions of the region masks are set to a value for background. The process for each of these two cases can include, generating an image mask the same size as the original image with pixels of the image mask initialized to a background value (e.g., all pixels set to zero), and setting pixels of portions of the image mask corresponding to each region mask to the pixels of each region mask. This could include setting pixel of the image mask to a foreground value (e.g., setting pixels to one) or other value(s) in the case of a trimap based on pixels in each region mask set to the foreground value or other value. Additional processing steps can be applied to the image mask, such as, for instance, smoothing object boundaries using dilation (i.e., addition of pixels to an object boundary) and/or erosion (i.e., removal of pixels from an object boundary).

In instances in which there are region masks that overlap, the image mask can be generated by merging the region masks by weighting pixel values of the regions masks based on saliency scores associated with the regions. In particular, pixel values of region masks for regions having higher saliency scores can be given greater weight than pixel values of region masks for regions with lower saliency scores.

In some configurations, the process of generating an image mask can include sorting the region masks based on the saliency scores of corresponding regions and iteratively processing the region masks in order of the saliency scores (e.g., processing regions in an order from higher saliency to lower saliency). This process can include, for instance, generating an image mask the same size as the original image with pixels initialized to a first value for background (e.g., all pixels set to zero). A zero valued weight matrix is created that is the same size as the image mask (also the original image) to record region mask weights. Each region mask is processed in order of its saliency score. For each region mask, the portion of the region mask that is new to the image mask and the portion of the region mask that is overlapping previous region mask(s) applied to the image mask are determined. If the region mask is all new (i.e., not overlapping with a region map previously applied to the image mask), the pixel values of the image mask corresponding to the region mask are set to the pixel values of the region mask and the process continues to the next region mask. Alternatively, if a portion of the region mask overlaps with a region mask previously applied to the image mask, the region mask is weighted based on the saliency score of its corresponding region. When each region mask has been processed, additional processing steps can be applied to the image mask, such as, for instance, smoothing object boundaries using dilation (i.e., addition of pixels to an object boundary) and/or erosion (i.e., removal of pixels from an object boundary).

Figure 4:
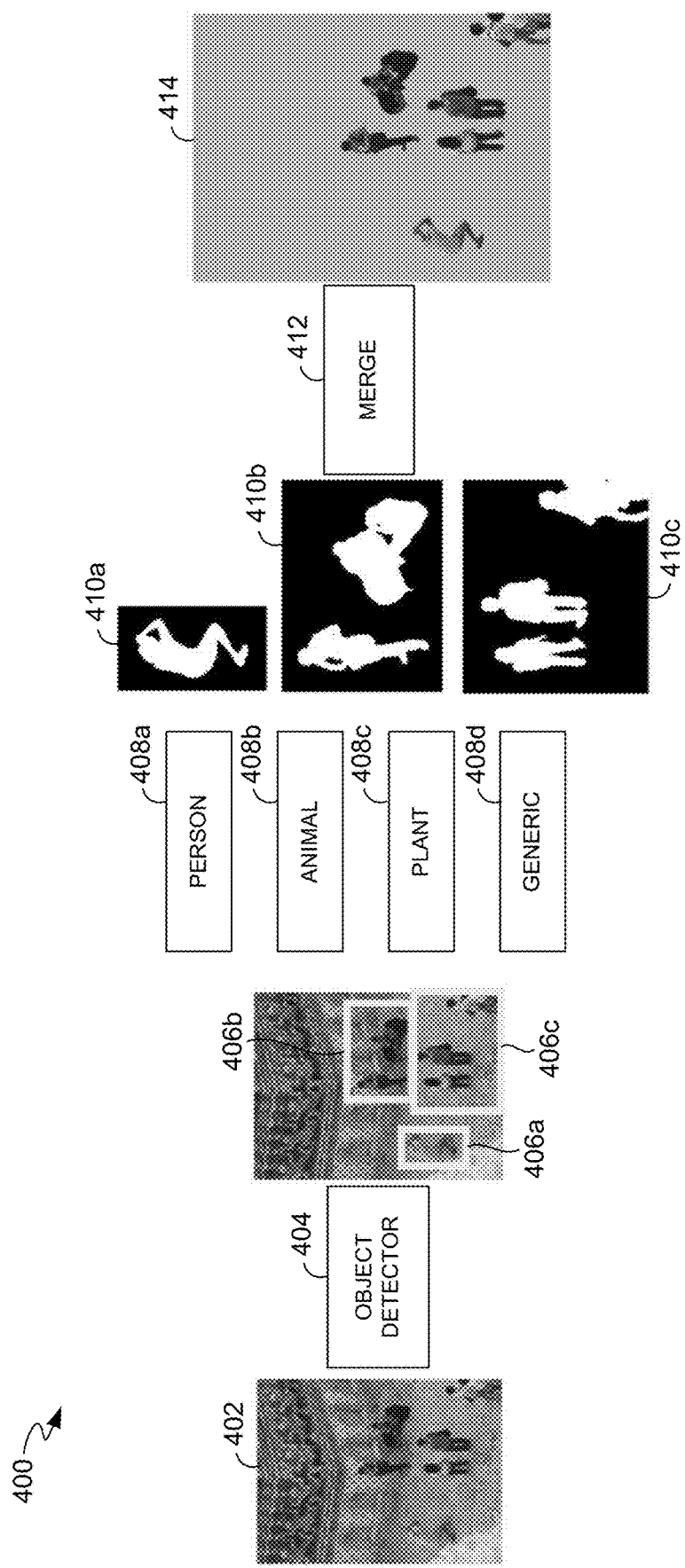
FIG. 4 is an example illustrating processing of an image region with an animal object in accordance with some implementations of the present disclosure

Referring now to FIG. 4, a diagram is provided illustrating an example pipeline for processing an image to generate an image mask selecting objects in the image. As shown in FIG. 4, an image 402 is received. The image 402 is processed using an object detector 404. The object detector 404 can, for instance, correspond to the object detector 114 of FIG. 1. The object detector 404 identifies regions 406a, 406b, and 406c with salient objects. As can be seen from FIG. 4, each region can have a single salient object or multiple salient objects. For each region, the object detector 404 can determine a saliency score for the region. The object detector 404 also determines a classification for each region based on a type of object in each region.

As shown in FIG. 4, a number of masking pipelines are available for generating region masks, including a person masking pipeline 408a, an animal masking pipeline 408b, a plant masking pipeline 408c, and a generic object masking pipeline 408d. The masking pipelines 408a-408d are provided by way of example only and other types of masking pipelines can be employed.

Each region is processed to generate a region mask using a masking pipeline selected based on the classification for each region. For instance, the region mask 410a is generated from the region 406a, the region mask 410b is generated from the region 406b, and the region mask 410c is generated from the region 406c. Although the objects of each region 406a, 406b, and 406 in the example of FIG. 4 comprise people such that each are processed using the person masking pipeline 408a, in accordance with aspects of the technology described herein, an image can contain regions with different classifications. In such cases, each region is processed with a different masking pipeline based on the region's classification. For instance, an image could include a person and an animal, in which a first region with the person is processed using a person masking pipeline and a second region with the animal is processed using an animal masking pipeline.

The region masks 410a, 410b, 410c are merged 412 to form an image mask, which comprises pixels with a foreground value where salient objects are located and background values for surrounding pixels (and one or more other values for some pixels in the case of a trimap). The image mask can be used for a variety of applications to select objects from the image 402. For instance, an image 414 is shown in which the image mask has been applied to the image 402 such that the salient objects from the image 402 are shown with surrounding areas removed.

Example Methods for Object Selection

Figure 5:
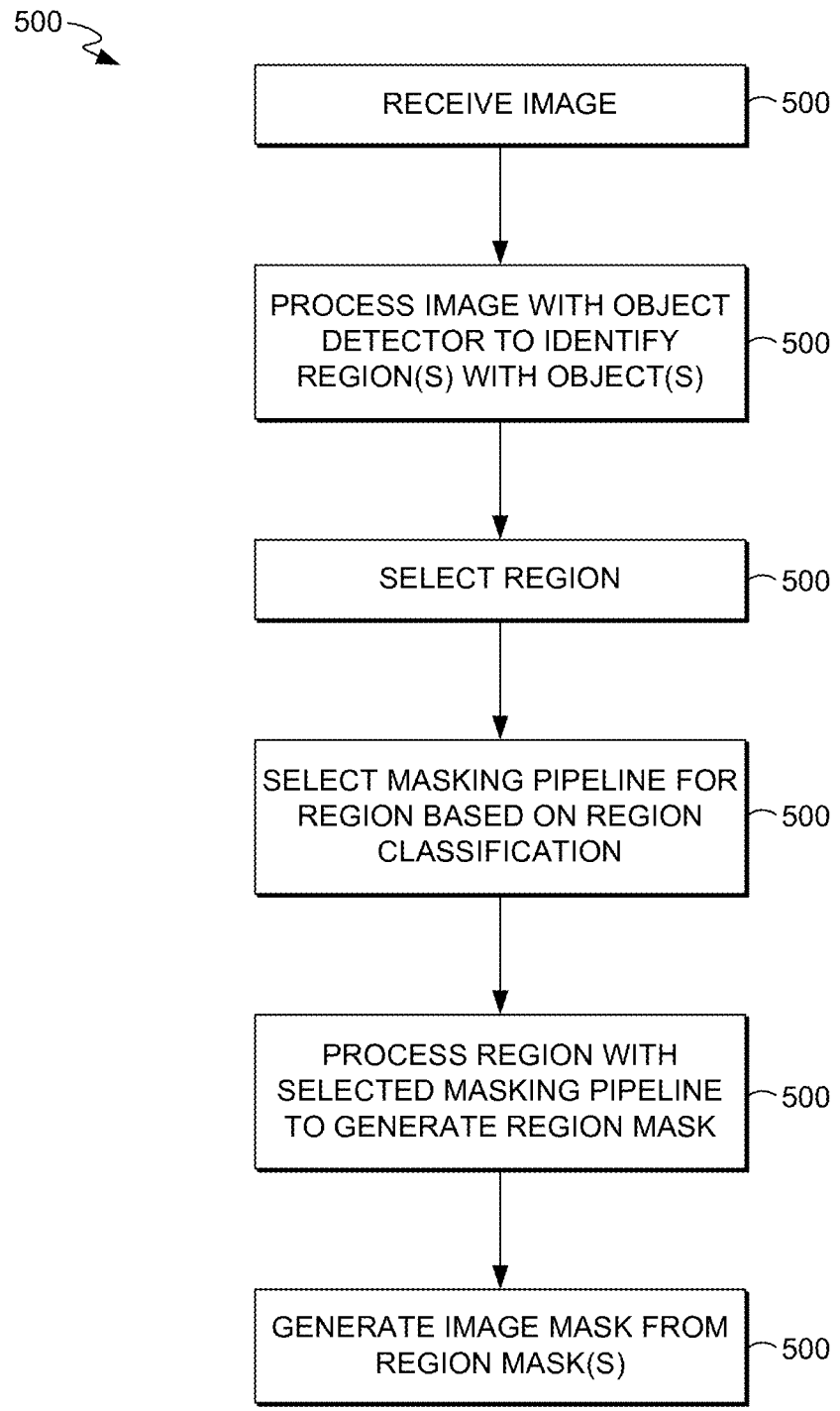
FIG. 5 is a flow diagram showing a method for selecting objects from an image in accordance with some implementations of the present disclosure.

With reference now to FIG. 5, a flow diagram is provided that illustrates a method 500 for object selection from an image. The method 500 can be performed, for instance, by the image processing system 104 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, an image is received for object selection. The image can include a number of different objects. One or more of the objects in the image are considered to be salient objects representing the object(s) that are likely target(s) for selection from the image. The image is processed using an object detector to identify one or more regions, each region having one or more objects, as shown at block 504. Additionally, the object detector determines a type of object in each region and classifies each region based on the object type. For instance, if the objet detector determines a region contains a person, the region is classified as a person region, or if the object detector determines a region contains an animal, the region is classified as an animal region. In some configurations, the object detector determines a saliency score for each region in the image and selects one or more regions for further processing based on the saliency scores. The saliency score for a region represents a likelihood that object(s) in the region are target(s) for selection from the image. In some configurations, only regions having a saliency score satisfying a threshold are selected for further processing.

As shown at block 506, a region is selected for masking. Based on the classification of the region, a masking pipeline is selected from a number of available masking pipelines, as shown at block 508. For instance, if the object detector classified a region as a person region, a person masking pipeline is selected for the region, or if the object detector classified a region as an animal region, an animal masking pipeline is selected for the region. Each of the available masking pipelines comprises one or more operations for generating a region mask from a region. The selected masking pipeline is used to process the region, as shown at block 510. The masking pipeline generates a region mask that selects portions of the region corresponding to each salient object in the region. For instance, the region mask can select pixels corresponding to each salient object in the region. If there are multiple regions, the process of blocks 506-510 is performed for each region to generate a region mask for each region. The regions can be processed serially or in parallel.

An image mask for the image is generated from each region mask, as shown at block 512. In some cases, only a single region from an image is processed, and the image mask comprises the selected portions of the region corresponding to each salient object in the region. In other cases, the image contains multiple regions, and the image mask is generated by merging the region masks. The region masks can be merged, for instance, using the method 600 described below with reference to FIG. 6. Generation of the image mask can including additional processing steps, such as, for instance, smoothing object boundaries using dilation (i.e., addition of pixels to an object boundary) and/or erosion (i.e., removal of pixels from an object boundary).

Figure 6:
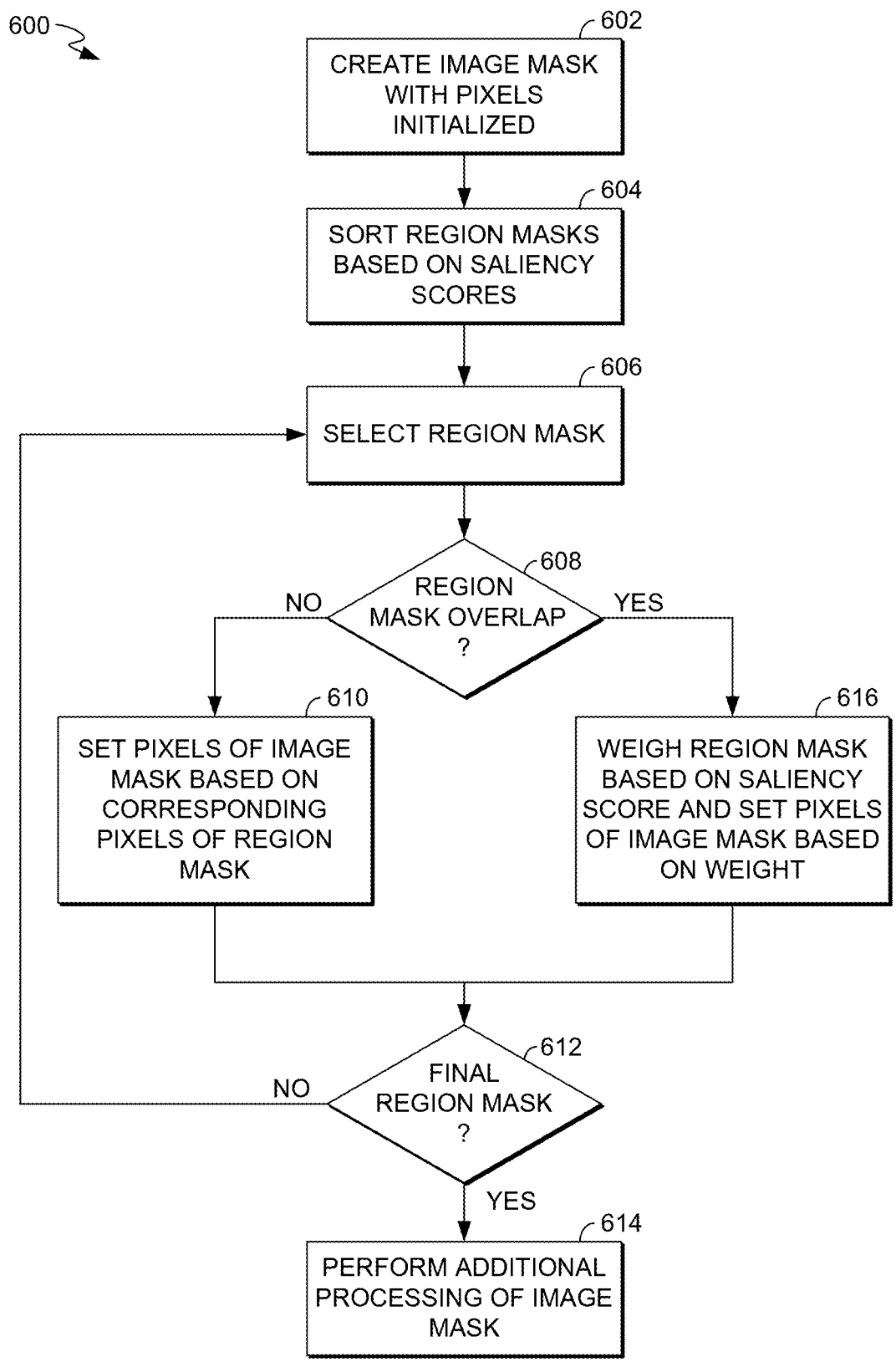
FIG. 6 is a flow diagram showing a method for merging regions to form an image mask in accordance with some implementations of the present disclosure.

Turning now to FIG. 6, a flow diagram is provided that illustrates a method 600 for merging multiple region masks to form an image mask. As shown at block 602, an image mask is created with pixels initialized to a first value. For instance, all pixels can be initialized to a background value of zero. The region masks are sorted based on the saliency scores of the corresponding regions determined by the object detector, as shown at block 604. For instance, the region masks can be sorted from highest saliency score to lowest saliency score.

A region mask is selected for processing at block 606. A determination is made at block 608 regarding whether the selected region mask overlaps any regions masks previously applied to the image mask. If the selected region mask does not overlap any region mask previously applied to the image mask, pixels of the image mask corresponding to the region mask are set based on corresponding pixels of the region mask, as shown at block 610. For instance, pixels of the image mask can be set to a value of one when those pixels correspond to pixels of the region mask having a one value. In instances of a trimap, pixels of the image mask can be set to other values based on corresponding pixels of the region mask having other values. If the selected region mask is determined to overlap at least one other region mask that has been applied to the image mask, the selected region mask is weighted based on its saliency score, and values of the pixels of the image mask are set based on the applied weight, as shown at block 614.

After the selected region mask has been applied to the image mask at either block 610 or 612, a determination is made at block 614 regarding whether the currently selected region mask is the final region mask to be processed. If not, the selection and processing of a next region mask at blocks 606-612 is continued. Once it is determined at block 614 that all region masks have been processed, additional process of the image mask is performed (when appropriate), as shown at block 616. The additional processing can include, for instance, smoothing object boundaries using dilation (i.e., addition of pixels to an object boundary) and/or erosion (i.e., removal of pixels from an object boundary).

Exemplary Operating Environment

Figure 7:
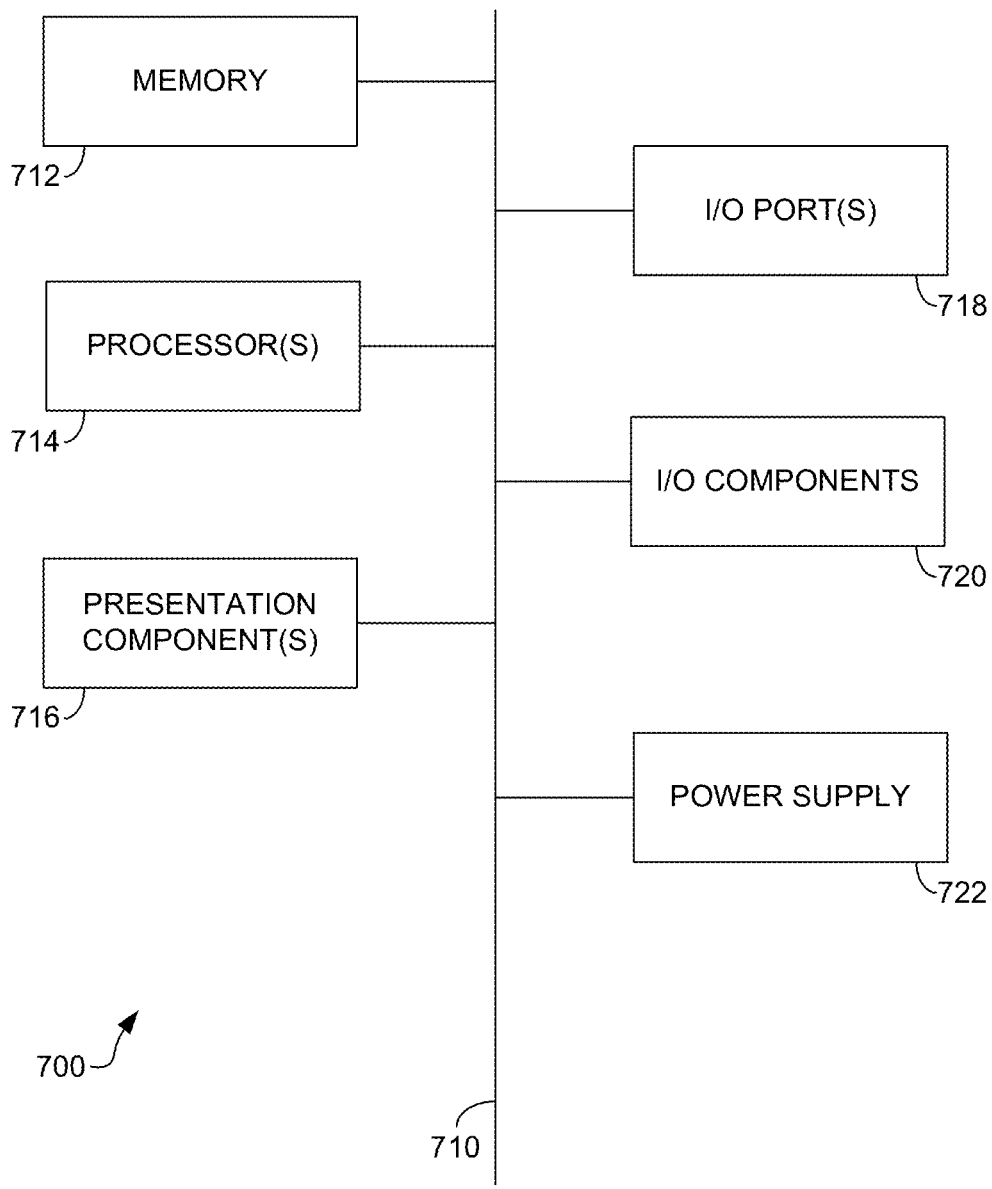
FIG. 7 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 7 in particular, an exemplary operating environment for implementing embodiments of the present technology is shown and designated generally as computing device 700. Computing device 700 is but one example of a suitable computing environment and is not intended to suggest any limitation as to the scope of use or functionality of the technology. Neither should the computing device 700 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 can be equipped with depth cameras, such as, stereoscopic camera systems, infrared camera systems, RGB camera systems, and combinations of these for gesture detection and recognition. Additionally, the computing device 700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
    processing an image to identify a first region having a first object and a second region having a second object and to determine a first classification for the first region and a second classification for the second region;
    selecting, from a plurality of masking pipelines, a first masking pipeline for the first region based on the first classification for the first region and a second masking pipeline for the second region based on the second classification for the second region;
    generating a first region mask selecting portions of the first region with the first object by using the first masking pipeline to process the first region that is a first portion of the image comprising less than the entire image;
    generating a second region mask selecting portions of the second region with the second object by using the second masking pipeline to process the second region that is a second portion of the image different from the first portion and comprising less than the entire image; and
    generating an image mask for the image by combining the first region mask for the first region and the second region mask for the second region.

2. The computer storage media of claim 1, wherein processing the image further comprises determining a saliency score for the first region and selecting the first region based on the saliency score for the first region satisfying a saliency threshold.

3. The computer storage media of claim 1, wherein the plurality of masking pipelines includes one or more selected from the following: a portrait masking pipeline, an animal masking pipeline, and a generic object masking pipeline.

4. The computer storage media of claim 1, wherein the first region comprises a third object, and wherein the first region mask selects portions of the first region with the first object and/or the third object.

5. The computer storage media of claim 1, wherein the first region mask includes pixels corresponding to the first object set to a first value and pixels corresponding with portions of the first region surrounding the first object set to a second value.

6. The computer storage media of claim 1, wherein combining the first region mask for the first region and the second region mask for the second region comprises:
    applying the first region mask to the image mask based on the first region being associated with a first saliency score higher than a second saliency score associated with the second region; and subsequently applying the second region mask to the image mask by weighting the second region mask based on the second saliency score.

7. A computerized method comprising:

processing, by an object detector, an image to detect a first region having a first object and a second region having a second object;

determining, by the object detector, a first classification for the first region and a second classification for the second region;

selecting, by a region masking component, a first masking pipeline for the first region based on the first classification and a second masking pipeline for the second region based on the second classification;

generating, by the first masking pipeline, a first region mask selecting portions of the first region with the first object by using the first masking pipeline to process the first region that is a first portion of the image comprising less than the entire image;

generating, by the second masking pipeline, a second region mask selecting portions of the second region with the second object by using the second masking pipeline to process the second region that is a second portion of the image comprising less than the entire image; and generating, by a merging component, an image mask for the image using the first region mask and the second region mask.

8. The method of claim 7, wherein, wherein processing the image further comprises:

determining a first saliency score for the first region and a second saliency score for the second region; and selecting the first region and the second region based on the first saliency score and the second saliency score satisfying a saliency threshold.

9. The method of claim 7, wherein the first masking pipeline and the second masking pipe is each selected from the following: a portrait masking pipeline, an animal masking pipeline, and a generic object masking pipeline.

10. The method of claim 7, wherein the first region comprises a third object, and wherein the region mask selects portions of the first region with the first object and/or the third object.

11. The method of claim 7, wherein the first region mask includes pixels corresponding to the first object set to a first value and pixels corresponding with portions of the first region surrounding the first object set to a second value.

12. The method of claim 7, wherein the first region mask and the second region mask are merged to generate the image mask by:

applying the first region mask and the second region mask to the image mask in an order based on a first saliency score associated with the first region mask and a second saliency score associated with the second region mask.

13. A computer system comprising:

a processor; and a computer storage medium storing computer-useable instructions that, when used by the processor, causes the computer system to perform operations comprising:

detecting, by an object detector, a first region of an image and a second region of the image, the first region having a first object of a first object type and the second region having a second object of a second object type;

selecting, by a region masking component, a first masking pipeline from a plurality of masking pipelines based on the first object type and a second masking pipeline from the plurality of masking pipelines based on the second object type;

generating, by the first masking pipeline, a first region mask from the first region by using the first masking pipeline to process the first region that is a first portion of the image comprising less than the entire image;

generating, by the second masking pipeline, a second region mask from the second region by using the second masking pipeline to process the second region that is a second portion of the image comprising less than the entire image; and generating, by an image masking component, an image mask using the first region mask and the second region mask.

14. The system of claim 13, wherein the object detector further determines a saliency score for the first region and the first region is selected based on the saliency score for the first region satisfying a saliency threshold.

15. The system of claim 13, wherein the first region comprises a third object, and wherein the first region mask selects portions of the first region with the first object and the third object.

16. The system of claim 13, wherein generating the image mask using the first region mask and the second region mask comprises:

applying the first region mask and the second region mask to the image mask in an order based on a first saliency score associated with the first region mask and a second saliency score associated with the second region mask.

* * * * *